United States Patent
Neils

[11] 4,352,290
[45] Oct. 5, 1982

[54] HEAT TRANSFER MEASURING APPARATUS

[76] Inventor: John J. Neils, Rte. 6, Box 97X, Priest River, Id. 83856

[21] Appl. No.: 132,280

[22] Filed: Mar. 20, 1980

[51] Int. Cl.$^3$ .................. G01K 13/00; G01K 3/08
[52] U.S. Cl. .................. 374/110; 116/216; 374/29
[58] Field of Search ......... 73/190 H, 193 R, 339 R, 73/339 C, 340, 343 R, 344, 374, 375, DIG. 7, 342, 343; 116/216

[56] References Cited

U.S. PATENT DOCUMENTS

| | | |
|---|---|---|
| 2,346,560 | 4/1944 | Crosthwait, Jr. et al. ......... 73/342 |
| 3,074,275 | 1/1963 | Hobin . |
| 3,144,548 | 8/1964 | Seigel . |
| 3,177,717 | 4/1965 | Oveson . |
| 3,724,267 | 4/1973 | Zoschak . |
| 3,765,238 | 10/1973 | Sumikama et al. . |
| 3,898,884 | 8/1975 | Hopkins et al. . |
| 3,905,228 | 9/1975 | Smith . |
| 3,979,952 | 9/1976 | Bornstein et al. . |

Primary Examiner—Charles A. Ruehl
Attorney, Agent, or Firm—Dorsey & Whitney

[57] ABSTRACT

A heat transfer measuring apparatus for a windowpane of a room includes a body portion defining an internal chamber with one open end adapted to fit against the inside surface of a windowpane. Within the chamber, which is thermally insulated from the ambient temperature conditions of the room inside such window is a temperature sensing element for measuring the temperature within the insulated chamber. A shield portion is positioned within the apparatus at a location between the temperature sensing element and the window opening. The shield permits air transfer for transmission of thermal energy from such a windowpane into the chamber area where the temperature sensing element is located, but limits the direct transmission of solar or other radiant energy through such window against the temperature sensing element. Comparison of the temperature within the chamber of the apparatus and the ambient temperature of the room indicates the relative or quantitative gain or loss of energy inwardly or outwardly through the window.

15 Claims, 5 Drawing Figures

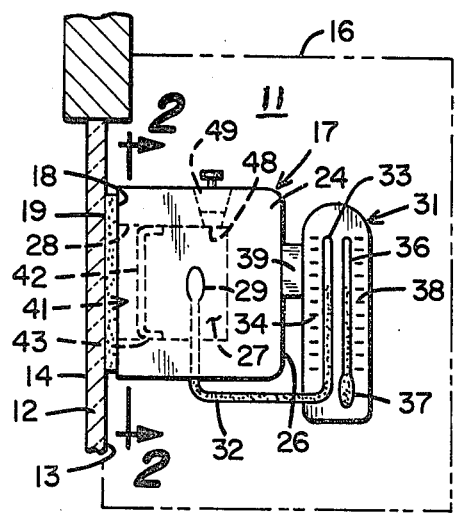
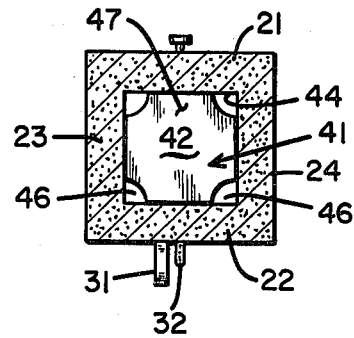
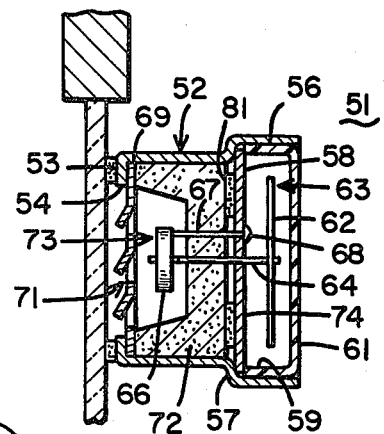
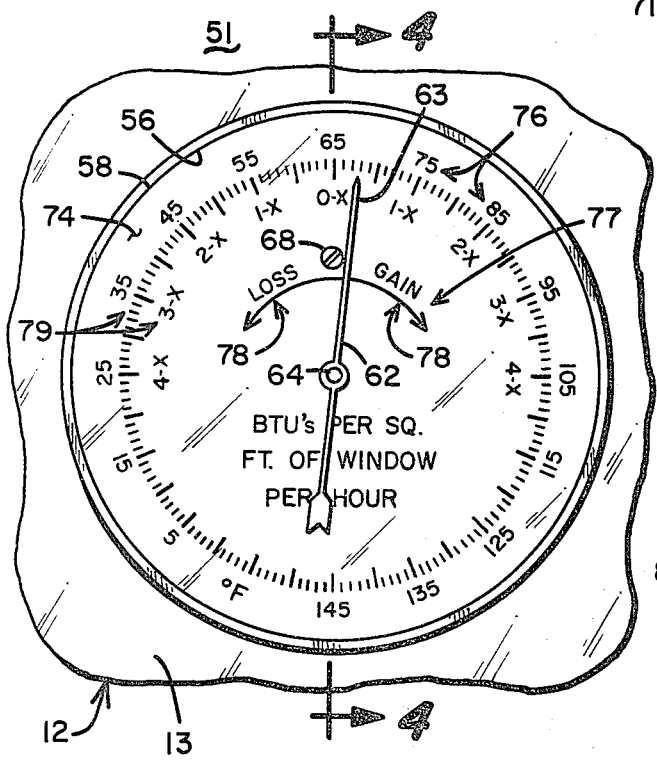
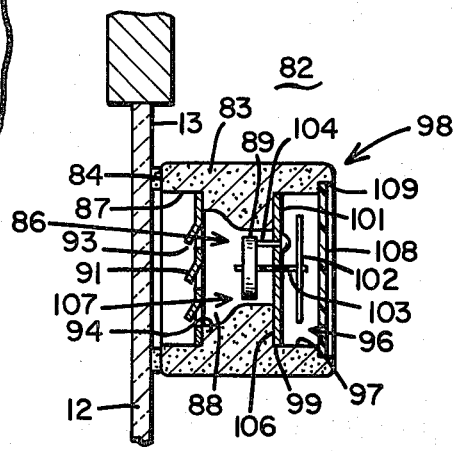

HEAT TRANSFER MEASURING APPARATUS

BACKGROUND OF THE INVENTION

The invention relates to apparatus for temperature measurement and more particularly for measurement of relative transfer of radiant or thermal energy through a transparent panel, such as window.

Thermometers of various types have been provided for sensing and displaying the temperature inside or outside of a building. In some cases, such thermometers include temperature sensing elements which can be positioned respectively inside and outside the window of a room, with the sensing elements connected to respective temperature indicators positioned side-by-side for convenient comparison at a location inside such a room, as in the case of so-called "indoor-outdoor thermometers."

In recent years, there has been increasing emphasis on the conservation of thermal energy in order to minimize the excessive use of scarce heating fuels for homes and other buildings and to maximize the use of solar energy for as much heating as possible. The use of window drapes has been suggested as a means for helping to prevent undesired loss of heat from the interior of a room through the windows of such a room. Such drapes adversely reduce the radiation of solar energy from the outside of the building into the room through such a window, if the drapes are closed when there is adequate external thermal radiation striking and passing through the window. In many cases, however, it is difficult to know whether the level of incoming solar or radiant energy is great enough to provide a temperature within the room which would be higher than or help maintain the interior room temperature, or whether such solar energy is insufficient to maintain the window surface at a temperature which would assist in maintaining the desired interior temperature with the curtains, drapes or blinds open, or whether such screening elements should be closed to minimize any undesired heat transfer one way or the other through such a window.

SUMMARY OF THE INVENTION

The present invention provides a relatively economical and structurally simple heat transfer measuring apparatus for a windowpane or other transparent panel of a room, in which the apparatus includes a body portion having an opening at one end adapted to fit against a small part of the inside surface of such a window. The body portion has wall elements defining an enclosed chamber adjacent such as windowpane at the inside surface thereof and the body portion is open at one end adjacent the windowpane to cooperate with the pane in defining an enclosed chamber inside the room and immediately adjacent the pane when the apparatus is in position. The body portion of the apparatus has a construction thermally insulating said chamber from the temperature within such a room, and the device includes a temperature sensing element positioned within the chamber of such body portion.

Preferably a shield member is positioned within the body portion between the temperature sensing element and the opening, such shield having a construction and location providing for the transmission of thermal energy through or from such a windowpane into that portion of the chamber where the sensing element is located, but limiting the direct transmission of radiant energy through such a window against the temperature sensing element. In some cases, instead of a separate shield member, any necessary shielding of the temperature sensing element can be obtained by appropriate design of the wall elements defining the enclosed chamber and by positioning the sensing element at a suitable relative location within the chamber where the wall element design provides an adequate shield portion. The special shield portion may even be omitted in certain cases, particularly where no substantial solar radiation is likely to pass through a particular windowpane in a direction or radiation level adversely affecting the sensing element temperature.

Thus the chamber within which the temperature sensing element is positioned inside the apparatus of this invention is, in effect, a miniature room, which is itself insulated from the actual inside temperatures within the main room itself, but which represents for a small area of the window an analogous heat transfer "model" from which the existing heat transfer conditions between the inside of the main room and the exterior of the building can be conveniently determined and compared.

For this purpose, the invention provides a temperature indicating unit and scale at a convenient location within the room and close to or actually on the heat transfer measuring apparatus itself, and such indicating unit is connected to the temperature sensing element within the chamber for registering the actual temperature from moment to moment within that chamber. Such temperature can then be compared with the ambient inside room temperature. For this purpose, a separate inside thermometer can be used, or the comparison can be facilitated by use of a known indoor-outdoor thermometer unit, in which the outdoor temperature sensing element is actually mounted within the chamber of the apparatus, rather than outside the window.

According to a further feature of the invention, it is possible to use a single scale for indicating the actual temperature within the chamber of the apparatus and/or to provide one or more scales or indicators associated with the temperature indicator of such an apparatus to show whether there is a relative gain or loss of thermal energy in or from the room, as compared to a predetermined interior room temperature, such as the sixty-five degree F. temperature which has been recommended as a maximum interior temperature for winter in order to conserve heating fuels.

Thus the invention recognizes and makes use of the possibility that a temperature indicator, such as a thermometer, which has been designed to measure and indicate an actual ambient, steady-state temperature at a given moment, can be combined with other elements in a manner to provide an indication of the relative direction, or even the magnitude, of dynamic thermal energy flow or flux through a windowpane of a room at such a given moment or over a desired period of time.

Other features and details of the invention will be apparent from the following further description.

BRIEF DESCRIPTION OF THE DRAWINGS

In the drawings which form a part of this Application, and in which like reference characters indicate like parts, FIG. 1 is a side elevation of a heat transfer apparatus according to the invention, mounted against the inside surface of the windowpane of a room, with some elements shown in section and some internal elements in dotted outline;

FIG. 2 is a sectional view on the line 2—2 of FIG. 1;

FIG. 3 is an end view, looking toward the inside surface of a windowpane, of a further embodiment of the invention;

FIG. 4 is a partial sectional view on the line 4—4 of FIG. 3; and

FIG. 5 is a view similar to FIG. 1 of another embodiment.

DESCRIPTION OF THE PREFERRED EMBODIMENTS

As shown in FIG. 1, a heat transfer measuring apparatus 11 is mounted against a windowpane 12, having inside and outside surfaces 13, 14 with respect to the interior of a room 16, indicated schematically by dotted outline. The body portion 17 of the apparatus has one end 18 adapted to fit against the inside window surface 13 and to be secured thereto by an adhesive bonding layer 19 or other suitable means. The body portion has top and bottom wall portions 21, 22, and sidewall portions 23, 24, (see FIGS. 1 and 2), as well as an end wall portion 26 at the inner end of the apparatus spaced from the window.

These body wall portions define an internal chamber 27 with an opening 28 at the end 18 adapted to fit against the pane 12. The body wall portions of this embodiment of the invention are made of thermally insulating material, such as foam insulation, which has sufficient rigidity to support the limited structural elements involved and to thermally insulate the internal chamber 27 from the ambient temperature within the remainder of room 16. Since the chamber opening 28 faces the inside surface 13 of the windowpane, however, the temperature within internal chamber 27 is responsive to the actual temperature of the pane and to the relative transfer of radiant or other thermal energy in one direction or the other through such pane.

A temperature sensing element 29 is positioned inside chamber 27 and consists of a thermometer bulb responsive to the expected range of temperatures inside the room and window. In this embodiment, temperature sensing element 29 is part of an indoor-outdoor thermometer 31 and is connected to the display portion of such a thermometer by connecting tube 32 and indicating tube portion 33. Indicating scale 34 shows the actual temperature at the sensing element 29 by expansion and contraction of the appropriate fluid in the elements just described. Thus the "outdoor" scale of such an indoor-outdoor thermometer can be conveniently used to display the temperature within the internal chamber 27. Thermometer 31 also includes an indicating tube 36 connected to bulb 37 and cooperating with indicating scale 38 for sensing and displaying the ambient or "indoor" temperature within room 16 in the immediate vicinity of the thermometer. Thermometer 31 may be supported at any desired convenient location, but is preferably mounted on supporting bracket 39 on the end wall portion 26 of the present apparatus, where it will be fully shielded by the body portion 17 of the apparatus from any direct transmission of radiant energy through windowpane 12.

According to a further feature of the invention, a shield member 41 is positioned within the body portion of the apparatus at a location between temperature sensing element 29 and the opening 28 of chamber 27, i.e. between the temperature sensing element and the expected window area against which the open end of the apparatus is to be supported.

In this embodiment, shield member 41 consists of a plate 42 having supporting edge flanges 43 secured to inner wall surfaces 44 of internal chamber 27 at a location spaced from both the temperature sensing element and the end 18 of the apparatus. As shown in FIG. 2, plate 42 has corner openings 46 and a solid imperforate center area 47. The corner openings provide for movement of air between the portion of chamber 27 immediately adjacent windowpane 12 and the portion of the chamber immediately surrounding the sensing element 29. At the same time, however, the imperforate central portion 47 of the shield member effectively prevents the direct transmission of radiant energy through the window and against the temperature sensing element. Thus the sensing element more accurately reflects the ambient temperature within the internal chamber 27 in a manner analogous to the temperature within the room 16 itself, without being adversely affected by direct radiation of solar energy against the sensing element 29.

As shown in FIG. 1, the body portion of the present apparatus may also be provided with one or more access openings 48 with manually operable closure members or plugs 49 which can be selectively opened or removed, either for access to or inspection of the interior of the chamber and its sensing element, or to provide for circulation of air and equalization of temperature within internal chamber 27 and the ambient environment within room 16 at some time prior to the actual measurement of the relative temperatures in those respective areas. A single plug could be pulled to get rid of moisture in the chamber. Moreover, the choice of material for the shield member 41, and the mass of such member can be selected and established as a matter of initial design, to vary the possible response time during which radiant incoming energy might raise the temperature of the shield member itself and to minimize the possibility that the shield member might, by increased temperature of the shield, become to some degree an undesired radiator of direct thermal energy toward the sensing element 29. Alternate shield members of different materials and masses may be provided for substitution and use in specific individual applications of the apparatus.

FIGS. 3 and 4 show another embodiment 51 of the invention. In this case, the body portion of the apparatus has a cylindrical sidewall casing portion 52, rather than the rectangular sidewall portions of the device 11 of FIGS. 1 and 2. This body portion includes a window engaging flange 53 at one end, and thus provides an opening 54 immediately adjacent the inner surface 13 of a pane 12. The opposite end of body portion 52 includes an inner enlarged cylindrical section 56, which is connected to portion 52 by an internal shoulder 57 on which an end plate 58 can be supported. Plate 58 serves both as a circular dial portion for the temperature sensing element of this embodiment and as a supporting plate for the other elements of a suitable thermometer. A circular flange 59 on a clear plastic cover 61 fits within the enlarged cylindrical portion 56 and can be secured in position to hold the end plate 58 against shoulder 57. Cover 61 also encloses and protects the indicating elements of the thermometer and its transparency permits visual observation of the movable pointer 62 which has an indicating end 63 and is carried by a rotary shaft 64 connected to a metallic temperature sensing coil 66 in the internal chamber 73 of this apparatus. The temperature sensing element is supported in turn by a supporting post 67 secured to end plate 58 by appropriate means, such as a bolt 68, which may also be axially or laterally adjustable with respect to plate 58. Thus the operating location of sensing element 66 can be accurately established, so that rotary shaft 64 is properly aligned with its desired axis of rotation to move the pointer 62 and provide the desired visual indication of specific or relative temperature. The shield member of this embodiment is a plate 69 provided with louvers 71 which provide air communication between the internal chamber area immediately adjacent windowpane 12 and the chamber area in which the metallic temperature sensing element 66 is located. The louvers are shown as extending horizontally, and in a direction having somewhat the effect of a venetian blind, such that direct solar radiation from the outside of the window cannot pass directly through the louvers against the sensing element. Louvered plate 69 is conveniently supported by the inner surface of window flange 53 and may be held against such flange by an internal body portion 72 of thermal insulation material. This thermally insulating internal body portion 72 fills the circular periphery and inner end of the space within the apparatus 51 and thus defines portions of the relatively small inner chamber 73 in which the thermal sensing element is positioned. Such element is accordingly insulated from ambient temperature within the room in which the apparatus is mounted.

As shown in FIG. 3, the surface 74 of end plate 58 which faces away from the window and toward the clear plastic cover 61 is provided with one or more appropriate temperature or heat transfer (flux) scales. One form of such a scale is illustrated by the scale 76 showing actual temperature in degrees Fahrenheit within the inner chamber. In this case, no separate room temperature sensing element or indicator has been provided, but the actual temperature indications on scale 76 can be compared with those of an independent interior thermometer conveniently located within room 16.

As further shown in FIG. 3, a special scale or scales 77 may be provided to show the relative direction of dynamic thermal energy flow or flux, i.e., whether or not there is a net gain or loss of thermal energy at any given moment through the pane 12. In this case, the special scale 77 is designed to show whether there is a relative heat loss or gain with respect to an assumed room temperature of 65° F., the maximum temperature often recommended for winter heating to enhance fuel conservation. Thus arrows 78 indicate whether the temperature conditions are such that there can be a net gain or loss of heat within the main room 16, if the drapes for window 16 were entirely open. If the temperature in internal chamber 73 is less than the controlled 65° F. temperature of the room, then the drapes or blinds at such a window should be closed to minimize heat loss through the total window area on that side of the building. If the indicator shows a temperature above the regulated 65° F. temperature, then fuel could be conserved by opening all drapes or blinds on the same side of the building, or at least such windows on that side as are subjected to the same solar radiation.

As shown at 79, a special scale can also be provided to show the actual loss or gain of heat in BTUs per unit of window area per unit of time. To enable use of such a special scale for different desired ambient room temperatures, such special scale can be mounted for relative rotation so that its zero point can be set at such other ambient temperatures, or the scale can be arranged for simple removal and substitution of a different scale for situations where room temperatures other than 65° F. are to be maintained.

The device of FIGS. 3 and 4 illustrates a form of construction for a heat transfer measuring apparatus, in which the various parts are designed for convenience and economy of manufacture. Thus the cylindrical construction of the body portion with its window flange at one end and its enlarged portion and shoulder at the other end makes it possible to assembly such a unit by starting with the cylindrical body portion alone, inserting the shield member 69 against the window flange 53, assembling the remaining parts on end plate 58, with the thermally insulating body portion 72 suitably bonded at 81 to the end plate and with the temperature sensing element, rotary shaft and pointer then sub-assembled thereon. The end plate can then be inserted in the enlarged cylindrical inner end of the body portion until the thermal insulating portion 72 engages the shield plate 69 to hold it against the window flange 53, and the clear plastic cover member 61 can then be inserted in the enlarged cylindrical portion 56 and secured therein to engage and hold the end plate 58 against shoulder 57.

Cover 61 serves the additional purpose of preventing circulation of room air into the recess provided by portion 56. Thus the possible further circulation of such air through the shaft opening in end plate 58 and into the inner chamber 73, where it might affect the accuracy of the chamber temperature being sensed by element 66, is also avoided or minimized.

FIG. 5 shows another embodiment 82 also designed for simplicity and economy of construction and assembly and efficiency of operation. Device 82 has a unitary body portion 83 of relatively rigid and self-supporting foam-type thermal insulating material.

Body portion 83 is cylindrical, so that the end view of the device of FIG. 5 is generally similar to FIG. 3. The same or possibly different scales may be used. For example, in the case of FIG. 5 one scale may indicate inner thermal chamber temperatures in degrees Fahrenheit, while a companion scale shows inner chamber temperature in degrees Centigrade. The body portion has one end 84 adapted to fit against a relatively small area of the inner pane surface 13. The body portion includes a first recess 86 at the window end of the device, and this recess has an end opening 87 therein of relatively small circular area, for example, of the order of only three inches (3) in diameter. Thus the recess and its opening, when fitted against a windowpane, define an enclosed inner thermal chamber 88, within which a temperature sensing element is mounted. The sensing element is preferably a metallic unit of the type shown in FIG. 4 which drives an indicator pointer through a rotary shaft, all such parts being mounted on a combination supporting and indicator plate functionally similar to the arrangement of FIG. 4.

A radiation shield member 91, similar to the shield of FIG. 4 is provided with louvers 93 for air circulation between the windowpane and the sensing element, and these louvers are so arranged as to provide shielding areas which block the direct transmission of radiant energy inwardly through the window and against the sensing element.

The inner wall of this first recess, which defines the thermal chamber, has an inner cross section of smaller area than opening 87 and thus provides an inner annular shoulder 94, against which the shield member can be inserted from the window end of the device 82 against such shoulder. Instead of a continuous circumferential shoulder, a plurality of inwardly projecting, circumferentially spaced individual shoulders can be provided. The continuous circular shoulder is preferable for ease in forming the recessed body by molding or drilling of such recess and shoulder.

In this FIG. 5 embodiment, the foam plastic body portion 83 is provided with a second recess 96 having an external opening 97 at the opposite end from the window end. The temperature indicator 98 includes end plate 99, scale 101, pointer 102, and means 103 in the form of a rotary shaft connecting the pointer to the sensing element 89 as described above and in connection with FIG. 4. The temperature indicator also includes means 104 mechanically supporting the sensing element from the plate 99, for example by a bolt or post as in FIG. 4.

The second recess 96 is also provided with an inner shoulder 106 of smaller inner cross section than the opening 97 in order to support plate 99 when it is inserted into the recess from the end opposite the window.

In this embodiment, a narrow opening 107 is provided between the first and second recesses to facilitate the mounting of the entire temperature indicator and its sensing element through the opening 97, so that the sensing element will be exposed to the temperatures in the first recess. A transparent cover 108 covers the opening 97 and is fitted and supported in a slightly enlarged further recess which provides a supporting shoulder 109 for airtight engagement by the cover 108. The provision of such a cover, and the forming of inner opening 107 with as small a cross section as possible so as to barely permit insertion of the sensing element initially from the second recess to the first recess, combine to prevent or minimize the transmission of room temperature air through the second recess and along the temperature indicator parts into the inner thermal chamber of the first recess. Thus the operation of this embodiment is essentially and functionally similar to that of the device of FIG. 4, and the arrangement of FIG. 5 is particularly adapted to facilitate the use of a prefabricated subassembly of the internal sensing and indicating elements of a standard rotary thermometer, while adapting such a subassembly to the thermal insulating body portion of the present embodiment, with its inner thermal chamber and heat shield.

The invention described herein accordingly provides an improved heat transfer measuring apparatus which can be used for determination from time to time during a given day or night of the relative gain or loss of heat through the windows of a room and building, so that appropriate monitoring of the open or closed condition of various drapes, blinds or shutters, can be efficiently undertaken. It will be understood that conditions at any given moment will be different at different sides of the same room or building, and perhaps even at different windows of the same side, depending on the relative angle from which solar radiation is received and the possible presence or absence of intervening buildings or other objects which might screen a particular window in whole or in part. The relative simplicity and economy of the individual elements of the apparatus and of the manner of assembling them into an operating measuring device make it feasible to provide a plurality of such units within a given room or building, so that such units can be left permanently installed against the respective windows involved and can thus provide the necessary information for optimizing the heat transfer conditions at each window. Although the foregoing description has emphasized the possible savings in fuel consumption by taking advantage of incoming solar radiation and minimizing outward thermal losses through a window during a winter season, it will be apparent that the apparatus has equal utility in controlling summer conditions, where blinds and drapes can be closed during periods of incoming solar radiation to minimize the load on air conditioning equipment, while such drapes and blinds can be opened during periods when there can be a net cooling of the room by thermal transmission outwardly through the windows, and thus achieving some of the desired cooling with minimal use of such air conditioning equipment.

The volume of the inner thermal chamber of the various embodiments of the invention, and the arrangements for air circulation from a pane surface to the sensing element, are designed to provide reasonably prompt response and temperature equilibrium in the chamber, when the rate of heat transfer through the pane changes. A relatively small inner chamber volume is thus coordinated with the small area of the particular windowpane-fitting opening of the chamber.

The foregoing specification sets forth certain perferred embodiments and modifications of the invention and some of the ways in which the invention may be put into practice, including the best mode presently contemplated by the inventor for carrying out this invention. Modifications of the described embodiment, as well as alternate embodiments and devices for carrying out the invention, may also be apparent to those skilled in the art, within the spirit and scope of the following claims.

I claim:

1. A heat transfer measuring and indicating apparatus for a windowpane of a room, said apparatus comprising a body portion having one end adapted to fit against part of the inside surface of such a windowpane, said body portion having wall portions defining an enclosed chamber adjacent such pane and inside such room when said one end is fitted against the pane, said body portion having a construction thermally insulating said chamber from the temperature within such room and providing a chamber temperature responsive to both the actual temperature of such pane and the relative transfer of energy through such pane to and from said chamber, a temperature sensing element positioned within the chamber of said body portion at a location therein spaced inwardly from said one end and from such pane, and a temperature indicator operatively connected to the temperature sensing element and conveniently visible to a nearby user inside such room.

2. A heat transfer measuring apparatus for a windowpane of a room, said apparatus comprising a body portion having an opening at one end adapted to fit against part of the inside surface of such a windowpane, said body portion having portions defining an enclosed chamber adjacent such pane and inside such room when said one end opening is fitted against the pane, said body portion having a construction thermally insulating said chamber from the temperature within such room, a temperature sensing element positioned within the chamber of said body portion, a temperature indicator operatively connected to the temperature sensing element and conveniently visible to a nearby user inside such room, and a shield member portion positioned within said body portion between the temperature sensing element and the opening, said shield portion having a construction and location providing for the transmission of thermal energy from such a windowpane into said chamber while limiting the direct transmission of radiant energy through such pane against the temperature sensing element.

3. Apparatus according to claim 2 in which the shield member portion consists of a plate extending across the enclosed chamber at a location between the sensing element and opening, the plate having at least one open area for circulation of air throughout the chamber and at least one imperforate area blocking such direct transmission of radiant energy against the sensing element.

4. Apparatus according to claim 2 in which the temperature indicator is mounted on a wall portion of the apparatus which is spaced from the end opening and generally parallel to a pane against which the apparatus is adapted to be supported.

5. Apparatus according to claim 4 in which the temperature sensing element includes a bulb, the temperature indicator includes an indicating tube, a connecting tube, and an expansible fluid within such tubes and bulb, and in which the indicating tube is positioned on said wall portion at a location where the body portion blocks direct transmission of radiant energy from such window to such tubes.

6. Apparatus according to claim 5 in which the temperature indicator is part of an indoor-outdoor thermometer which includes a separate indicator tube and bulb at said wall portion location for exposure to and indication of the ambient room temperature around such apparatus.

7. Apparatus according to claim 2 in which the temperature indicator includes a connection extending from the temperature sensing element through an end wall portion of the apparatus which is spaced from the end opening and is generally parallel to a pane against which the apparatus is adapted to be supported.

8. Apparatus according to claim 7 in which the temperature sensing element is a metallic coil, and the temperature indicator includes a rotary shaft connected for rotation by said sensing element and extending through such end wall portion, at least one indicating scale on such end wall portion, and a pointer on the rotary shaft cooperating with such scale.

9. Apparatus according to claim 8 in which said one scale indicates the actual temperature within the enclosed chamber.

10. Apparatus according to claim 8 in which such indicating scale has calibrations indicating gain or loss of thermal energy through such a window with respect to a predetermined ambient room temperature.

11. Apparatus according to claim 10 having a further indicating scale which indicates the actual temperature within the enclosed chamber.

12. Apparatus according to claim 8 in which the body portion includes a first cylindrical section having an internally projecting window flange defining the opening at said one end and a second cylindrical section of greater internal diameter than the first section thereby providing a supporting shoulder at the junction of such sections, said end wall portion comprising a supporting plate within the second section and nested against such shoulder and having a supporting element connected to and supporting the sensing element, a transparent cover member also nested within the second cylindrical section and having a portion engaging and retaining the end plate against such shoulder, and a body portion of thermal insulating material carried by the end plate and extending into the first cylindrical section and defining and insulating the enclosed chamber, and the shield member consisting of a louvered plate supported between the window flange and thermal insulating material.

13. A heat transfer measuring apparatus for a windowpane of a room, such apparatus comprising a body portion of relatively rigid and self-supporting foam-type insulating material, said body portion having one end adapted to fit closely against a relatively small area of such a pane and having a first recess with an opening in said one end, said body portion and first recess defining an enclosed inner thermal chamber immediately adjacent such pane and inside such room and thermally insulated from such room when said one end is held against such a pane, a temperature sensing element positioned within said first recess, and a radiation shield member mounted in the first recess at a location spaced between the open end and the sensing element, the shield member having an area blocking direct transmission of radiant energy through such pane against the sensing element, and the construction of the body portion and shield member providing means for air circulation between such pane and sensing element, the body portion having a second recess with an external opening spaced from said one end, a temperature indicator mounted in the second recess and having a scale visible through such external opening, and means within the body portion operatively conneting the sensing element and indicator.

14. Apparatus according to claim 13 in which each recess in the body portion includes an inner shoulder of smaller cross section than its corresponding opening, the shield member having a shape and cross section adapted for insertion through the opening in the first recess and being positioned and secured against the inner shoulder of that recess, and the temperature indicator having a shape and cross section adapted for insertion through the opening in the second recess and being positioned and secured against the inner shoulder of that recess.

15. Apparatus according to claim 14 in which the body portion has a narrow inner opening between the first and second recess, and in which the indicator has means mechanically supporting the sensing element for convenient insertion of the sensing element through the second recess and inner opening when the indicator is mounted against its shoulder in the second recess, the temperature indicator including a rotary shaft and pointer operatively connected to and rotated by the sensing element, and a transparent cover extending across the opening of the second recess and preventing circulation of room air into the second recess, inner opening and against the sensing element.

* * * * *